Patented Nov. 7, 1922.

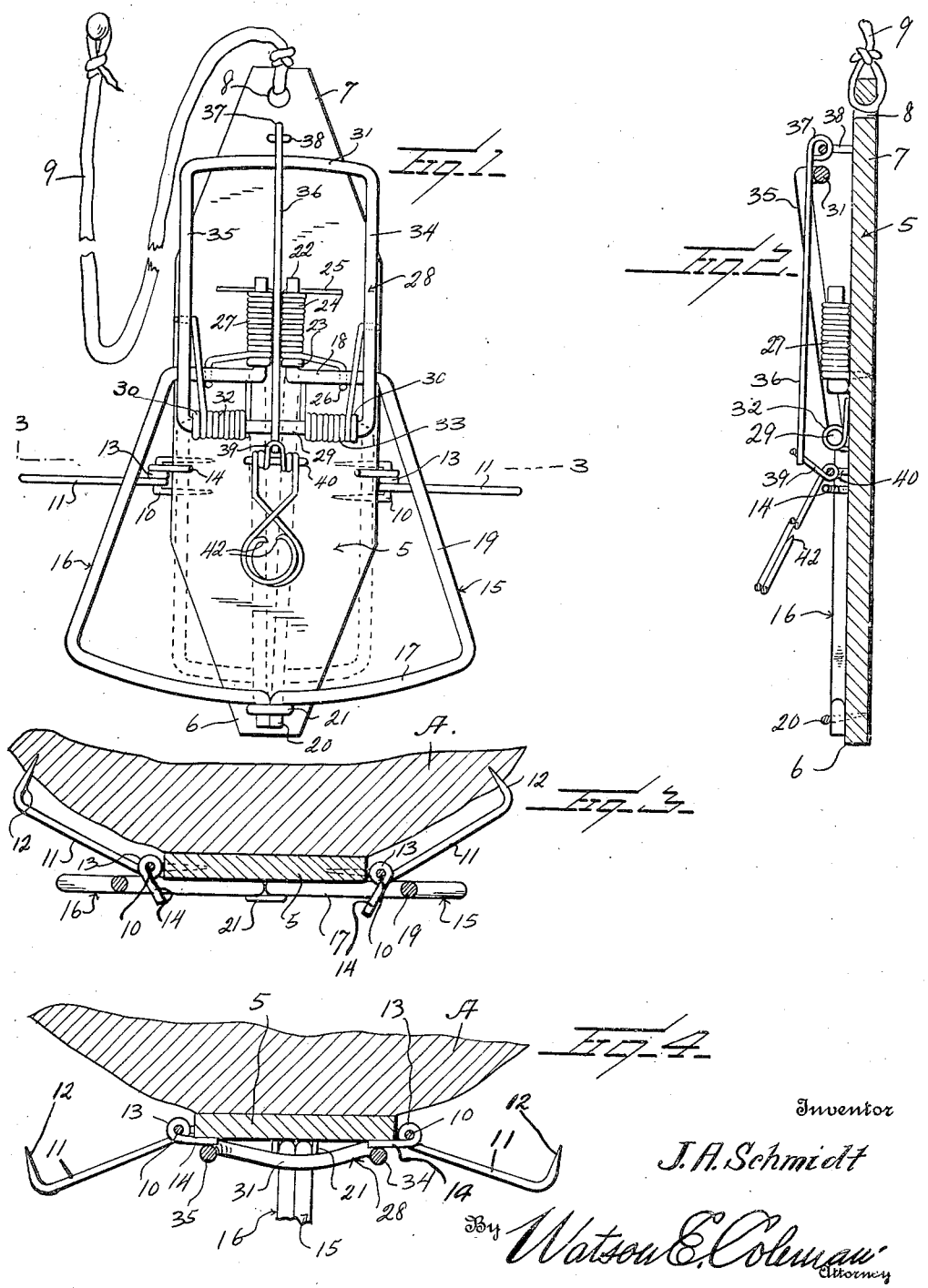

1,434,505

UNITED STATES PATENT OFFICE.

JOHN A. SCHMIDT, OF MARCUS, WASHINGTON, ASSIGNOR OF ONE-HALF TO CLARENCE H. DOBSON, OF MARCUS, WASHINGTON.

TRAP.

Application filed June 15, 1921. Serial No. 477,810.

*To all whom it may concern:*

Be it known that I, JOHN A. SCHMIDT, a citizen of the United States, residing at Marcus, in the county of Stevens and State of Washington, have invented certain new and useful Improvements in Traps, of which the following is a specification, reference being had to the accompanying drawings.

This invention relates to animal traps and has for its object to provide a trap capable of responding instantly to the movement of the trigger mechanism.

It is also an object of the invention to provide a trap of this character wherein each jaw of the trap is provided with spring means for urging said jaws toward each other and wherein a holding member is provided for holding the jaws open, said holding member being controlled by a trigger mechanism.

It is a further object of the invention to provide a trap of this character including a pair of jaws arranged to move toward and be moved away from each other, and a holding member which not only serves to hold the jaws in a set or open position through the medium of a trigger mechanism but also serves to prevent escape of the animal by interfering with the withdrawal of the head of the animal from the trap during movement of the jaws toward each other.

It is another object of the invention to provide a trap of this character wherein the jaw holding member also serves to release means carried by the trap to connect it to a support so that the force of the trapping operation will cause the trap to be disengaged from its support and suspended together with the animal so as to cause the death of the animal in a short time and keep the fur of the animal clean.

It is a still further object of the invention to provide a trap of this character wherein no resistance is offered to the trigger mechanism by the springs used to close the jaws so that binding of the mechanism is eliminated.

It is a still further object of the invention to provide a trap of this character wherein the means for holding the jaws in their set position moves in advance of and between the jaws when the said means is released by the trigger mechanism.

With these and other objects in view the invention consists in the improved construction and arrangement of parts to be hereinafter more particularly described, fully claimed and illustrated in the accompanying drawings in which:

Figure 1 is a plan view of a trap constructed in accordance with an embodiment of the invention, and showing the trap set.

Figure 2 is a longitudinal sectional view of the structure shown in Figure 1.

Figure 3 is a section taken on the line 3—3 of Figure 1, and

Figure 4 is a sectional view showing the manner in which the anchor members are released.

Referring to the drawings, 5 designates a base member, preferably an elongated base member which may be constructed of any suitable material, the end portions 6 and 7 of said base member being tapered. The end portion 7 is provided with an opening 8 adapted to receive a strap or cable 9 for securing the trap to an object such as a tree. Projecting from each side of the base member adjacent the intermediate portion of said member is a staple 10 adapted to receive an anchor member 11, said anchor member consisting of a length of material having its end portion 12 formed into a hook adapted to be embedded in the support A for the trap. The opposite end portion 13 of said length is coiled about the staple 10, while the extremity 14 extends over the base member substantially in offset parallel relation to the main portion of the length to provide an operating finger, the purpose of which will be hereinafter described.

A pair of jaw members 15 and 16 are provided, each jaw member consisting of a length of material bent to form arms 17 and 18, the arm 17 being considerably longer than the arm 18 so that the portion 19 of said jaw is substantially inclined with respect to the base. The extremity 20 of the arm 17 is extended at right angles to provide a trunnion which is disposed within a bearing 21 carried by the end 6 of the base. The extremity 22 of the arm 18 is extended at right angles to said arm 18 to provide a finger adapted to extend through a bearing 23 carried by the intermediate portion of the base member 5. The finger of the arm 22 is surrounded by a spring 24, the end 25 of the spring being secured to the base, while the end 26 is engaged with the arm 18 and is adapted to constantly urge the jaw 15 toward the jaw 16. The structure of the jaw 16 is similar to the structure of the jaw 15, the jaw 16 being also urged toward the jaw 15 through the medium of a spring 27 which operates similar to the spring 24.

A jaw holding member 28 is provided, said jaw member being substantially rectangular, and made from a single length of material, the ends 29 of said jaw member being extended toward each other and mounted in bearings 30 carried by the base member 5. It will be noted that the jaw holding member 28 is mounted inwardly of the jaws 15 and 16, that is, between the bearings 21 and 23 so that the holding member in action moves toward and between the jaw members 15 and 16. The end portion 31 of the holding member is bowed, so as to extend slightly over the tapered end 6 of the base when the holding member is in sprung position. A spring 32 is mounted on one of the end portions 29, while a spring 33 is mounted on the opposite end portion. One end of each of the springs 32 and 33 is adapted to be secured to the base member 5, while the opposite ends of the springs are engaged with the side portions 34 and 35 of the holding member. The springs as will be noted, are mounted at right angles to the springs 24 and 27 and are adapted to constantly urge the holding member inwardly of the jaws and toward the base. The portions 34 and 35 of the holding member are adapted to engage the arm 18 of the jaws 15 and 16 so as to hold the jaws open or set.

The holding member 28 is controlled by a trigger mechanism embodying a rod 36 which is pivoted at its end 37 to a support or staple 38 carried by the end portion 7 of the base. The rod 36 is adapted to extend over the end portions 29 and 31 of the holding member, or in other words, longitudinally of the holding member, the free end of the rod projecting laterally of and beyond the end portions 29. A combined bait holder and trigger member is mounted on the base 5 between the bearings of the holding member 28 and the bearings 21, said member consisting of a length of material having its intermediate portion formed into a loop 39 which serves as a trigger, said loop being adapted to engage the free end of the rod 36. The length is then coiled about a staple 40, the end portions being extended at right angles to the loop 39 and crossed. The extremities of said ends are coiled toward each other and formed into hooks 42 adapted to receive bait.

When the trap is set as above described, that is, with the holding member 28 engaged with the jaws 15 and 16 and held in position by the rod 36 and trigger 39, the anchors having been previously embedded in the support A for the trap, for instance a limb or trunk of a tree, and the cable 9 also secured to said limb, operation of the trigger member 39 by the animal will cause release of the rod 36, which will swing toward the end 7 of the base member, thereby releasing the jaw holding member 28 and permitting said member to instantaneously swing toward the end 6 of the base member through the medium of the springs 32 and 33. This movement permits the springs 24 and 27 to swing the jaws toward each other after the holding member 28 passes between the jaws and toward the base member 5, thereby permitting the trap to operate instantaneously and prevent escape of the animal. By constructing the arm 17 of each jaw longer than the arm 18, the holding member 28 is permitted to freely move between said jaws without danger of interfering with the operation of the trap, at the same time, the inclined portions 19 of the jaws are caused to move obliquely of the portions 34 and 35 of the holding member, so that when the holding member reaches the junction of the portions 19 with the arm 17, it will disengage the jaws and swing toward the base 5. As the holding member passes beneath the portions 19 of the jaws, the portions 34 and 35 of the holding member engage the operating fingers 14, thereby swinging the anchor members toward the base member and causing the hooks 12 to become disengaged from the limb. The force of the operation of the springs will cause the trap to become disengaged from the limb and be suspended therefrom together with the animal, thereby causing death of the animal in a short time and holding the body in spaced relation to the ground so that the fur is kept clean. From the foregoing it will be readily seen that this invention provides a novel form of trap which in view of its instantaneous operation prevents escape of the animal and at the same time causes the trap to be disengaged from the support so as to suspend the body of the animal. An important feature of the trap is that the means for holding and releasing the jaws also serves to release the anchor means of the trap, said means also providing an obstruction to prevent withdrawal of the head of the animal while the jaws are being moved toward each other, and all of these features are possessed by a device that is simple and compact in form, and which can be used indefinitely with entire satisfaction.

What is claimed is:

1. A trap of the character described comprising a base, jaws mounted on the base and adapted to be moved toward and away from each other, means for holding said jaws open or set, trigger means for holding the first mentioned means in engagement with the jaws, and anchor means carried by the base member and adapted to be released by the holding means.

2. A trap of the character described comprising a base, jaw members mounted on the base for movement toward and away from each other, a jaw holding member mounted on said base for movement substantially laterally and inwardly of the jaws, and a trigger mechanism for holding said jaw holding member upon said jaws.

3. A trap of the character described comprising a base, jaws pivoted at their ends to said base, springs carried by the jaws for urging said jaws toward each other, a jaw holding member pivoted to the base adjacent one of the pivotal connections of the jaws to the base and arranged for oscillating movement in a direction opposite to the movement of the jaws, springs carried by said member for urging the same between the jaws and toward the base, and a trigger mechanism carried by the base for holding said jaw holding member in engagement with the jaws.

4. A trap of the character described comprising a base, jaws pivoted to said base, spring means urging the jaws toward each other, a jaw holding member pivoted to the base substantially within the jaws for movement between said jaws, said member being arranged to extend over and beyond a portion of the jaws to hold said jaws open, spring means carried by said member for urging the same inwardly of the jaws, a trigger mechanism carried by the base between the jaws, and a rod pivoted to the base remote from the jaws and arranged to extend over the holding member and jaws into engagement with the trigger mechanism.

5. A trap of the character described comprising a base member, jaws pivoted to the base member, hook members pivoted to said member, each of said hook members having a finger extending toward the base, a jaw holding member mounted on the base and adapted to hold said jaws in their open or set positions, means for holding said jaw holding member in engagement with the jaws, said member being movable toward the base upon release of said means and into engagement with the projecting portions of the hooks, whereby said hooks are disengaged from the support of the base to permit movement of the base.

6. A trap of the character described comprising a base, a pair of jaw members, each jaw member having a long and a short arm, said arms being pivotally connected to the base member whereby the intermediate portion of each jaw is disposed in angular relation to the base, a substantially rectangular holding member pivoted to the base adjacent the short arm, said holding member being adapted to extend laterally of said short arms to hold the jaws in their open positions, and means for urging said holding member toward the base and between the jaws, said long arms of the jaws permitting unobstructed passage of the holding member between the jaws.

In testimony whereof I hereunto affix my signature.

JOHN A. SCHMIDT.